Dec. 12, 1961   B. DUBSKÝ ET AL   3,013,205
ELECTROMAGNETIC FEELER
Filed Jan. 21, 1959

INVENTORS
Bořivoj Dubský ~ Oldřich Straka
Miloslav Pan ~ Vítězslav Veselý
By Richard Low
Agt United States Patent Office 3,013,205
Patented Dec. 12, 1961

3,013,205
ELECTROMAGNETIC FEELER
Bořivoj Dubský, Oldřich Straka, Miloslav Pan, and Vítězslav Veselý, all of Prague, Czechoslovakia, assignors to Vyzkumny a zkusebni letecky ustav, Letnany, near Prague, Czechoslovakia
Filed Jan. 21, 1959, Ser. No. 788,138
Claims priority, application Czechoslovakia Jan. 28, 1958
2 Claims. (Cl. 324—34)

The present invention relates to an electromagnetic feeler with an internal source of polarization voltage, and operating on the magnetostrictive principle.

The existing electromagnetic feelers operating on the magnetostrictive principle are connected in a circuit sensitive to the phase. In these exciting devices the polarization voltage necessary for the operation of the device on the linear portion of its characteristic curve is attained by means of polarization feelers or by means of conveniently dimensioned transformers.

The electromagnetic feeler according to the present invention obtains the polarization voltage by means of an auxiliary winding or coil which is wound on the torsional body of the feeler in the same direction as the exciting winding or coil so that the exciting and auxiliary windings act as the primary and secondary of a transformer and the exciting current induces in the auxiliary winding a voltage which is exactly of the same phase as the voltage picked-up by the pick-up coil wound on the torsional body at right angles to the exciting and auxiliary windings. In this way a source of polarization voltage is obtained at very low manufacturing costs and without employing auxiliary external devices, for example, an auxiliary transformer. The obtained polarization voltage, in addition to being in phase with the voltage induced in the pick-up coil, varies in the same way as the voltage of the pick-up coil in response to any changes in the exciting current.

Figure 1:
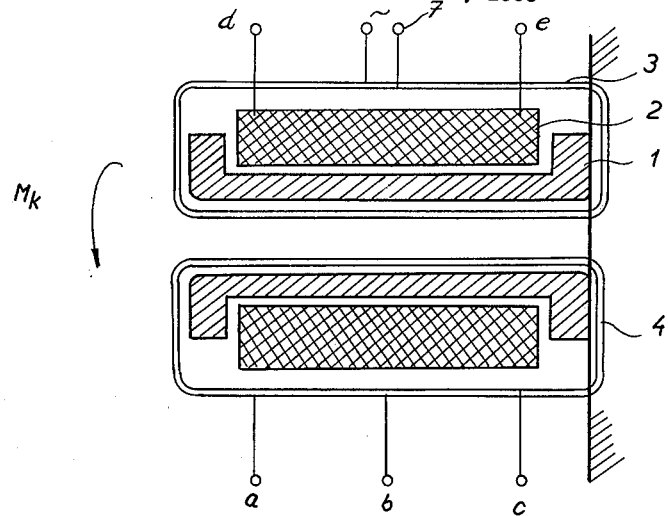
Figure 2:
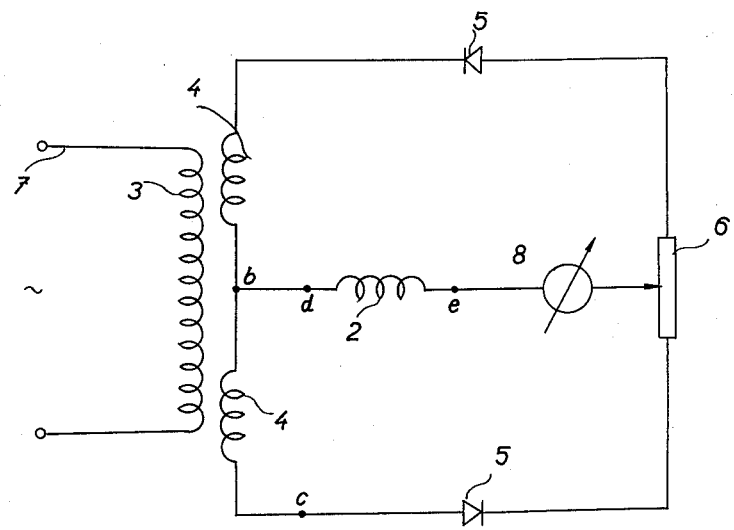

In the accompanying drawing:

FIG. 1 is a diagrammatic axial sectional view of an electromagnetic feeler embodying the present invention, and FIG. 2 is a wiring diagram of the electrical circuits associated with that feeler.

Referring to the drawing in detail, and initially to FIG. 1 thereof, it will be seen that a feeler embodying the invention includes a torsional body 1, one end of which is rigidly fixed, while the other end is adapted to be twisted by a torque $M_k$ which is to be sensed. A helical pick-up coil 2 is slipped in a free manner on torsional body 1. The torsional body and the pick-up coil are surrounded by an exciting winding 3 in the shape of a toroid and by a toroidal auxiliary winding 4. The exciting winding 3 is connected to a source of alternating exciting current 7.

As shown in FIG. 2, the auxiliary toroidal winding 4 is divided into two equal parts and the center $b$ of the auxiliary toroidal winding is connected to one end $d$ of the pick-up coil 2 and the other end $e$ of the pick-up coil is connected through a meter or indicating device 8 to the center tap of a zero-potentiometer 6. The ends of potentiometer 6 are connected through rectifiers 5 to the ends $a$, $c$ of the auxiliary toroidal winding 4.

When the torsional body 1 is twisted, a voltage which is proportional to the torsional stress of said torsional body is induced in the pick-up coil 2. An alternating polarization voltage of exactly the same phase as the voltage induced in the pick-up coil is induced in the auxiliary toroidal winding 4 as a result of the flow of alternating exciting current through the toroidal exciting winding 3. The polarization voltage creates in the circuit shown in FIG. 2 a current by means of which the rectifiers 5 are made to operate on a linear area of their characteristic curve. The whole circuit is balanced by the zero potentiometer 6 so that no current flows through the meter or indicator 8 so long as no voltage is induced in the pick-up coil 2. However, when torsional body 1 is twisted and alternating voltage is therefore induced in pick-up coil 2, the balance of the whole circuit is disturbed and meter 8 indicates the current which is proportional to the voltage induced in the pick-up coil, and thus proportional to the torque with which the torsional body is loaded.

The above described feeler embodying the present invention is of very simple construction so that it can be inexpensively produced and its operation is very stable and precise.

Although an illustrative embodiment of the invention has been described in detail herein with reference to the accompanying drawing, it is to be understood that the invention is not limited to that precise embodiment, and that various changes and modifications may be effected therein without departing from the scope or spirit of the invention, except as defined in the appended claims.

What we claim is:

1. An electromagnetic feeler comprising a torsional body adapted to be torsionally stressed, an exciting coil wound on said torsional body, a source of alternating exciting current connected to said exciting coil so that the latter is effective to establish a magnetic field in said body, a pick-up coil wound on said body with the turns of said pick-up coil extending generally in the same direction as the lines of flux of said magnetic field so that a voltage is induced in said pick-up coil only when said magnetic field is deformed in response to torsional stressing of said body, an auxiliary coil wound on said body in the same direction as said exciting coil and having a polarizing voltage induced in said auxiliary coil by the exciting current flowing through said exciting coil, a zero-potentiometer having a center tap, circuit means connecting the ends of said zero potentiometer with the ends of said auxiliary coil and having rectifying means interposed therein, current indicating means, and circuit means connecting one end of said pick-up coil to the center of said auxiliary coil and connecting said indicating means between the other end of said pick-up coil and said center tap of the potentiometer so that a current flows through said indicating means only in response to the inducing of a voltage in said pick-up coil by torsional stressing of said body.

2. An electromagnetic feeler as in claim 1; wherein said torsional body is in the form of an open-ended tube, said pick-up coil being wound circumferentially on said tube, and said exciting and auxiliary coils being both toroidal and passing axially through said tube and axially along the outside of the tube.

References Cited in the file of this patent

UNITED STATES PATENTS

| | | |
|---|---|---|
| 2,511,178 | Roters | June 13, 1950 |
| 2,557,393 | Rifenbergh | June 19, 1951 |
| 2,876,419 | Gianola et al. | Mar. 3, 1959 |
| 2,912,642 | Dahle | Nov. 10, 1959 |